April 28, 1925.  1,535,188
M. E. THOMPSON
EDUCATIONAL RECORD
Filed Oct. 12, 1922
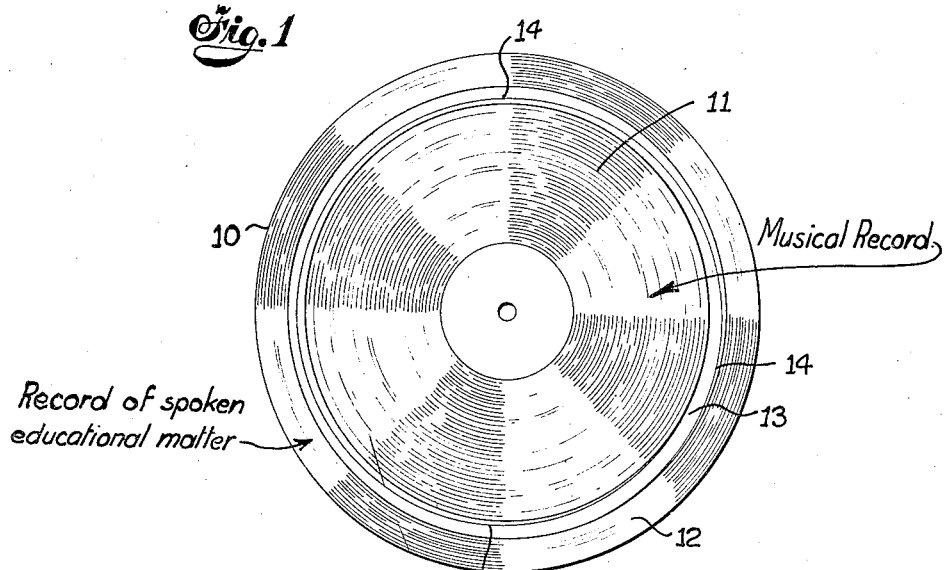
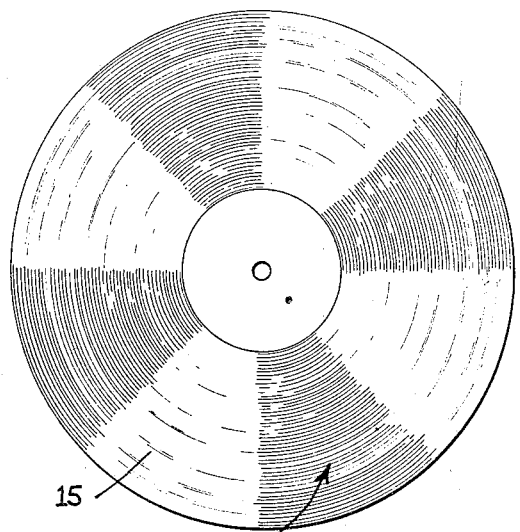
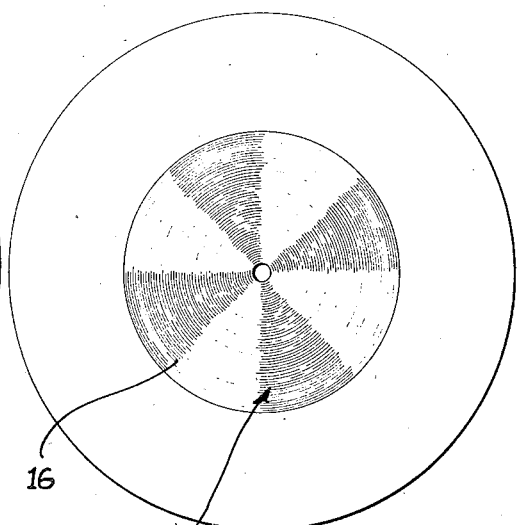
INVENTOR.
Milton E. Thompson.
BY
ATTORNEY.

Patented Apr. 28, 1925.

1,535,188

UNITED STATES PATENT OFFICE.

MILTON E. THOMPSON, OF RIDGWAY, PENNSYLVANIA.

EDUCATIONAL RECORD.

Application filed October 12, 1922. Serial No. 594,020.

*To all whom it may concern:*

Be it known that I, MILTON E. THOMPSON, a citizen of the United States, and a resident of Ridgway, Elk County, State of Pennsylvania, whose post-office address is care of Ridgway Dynamo & Engine Company, same place, have invented new and useful Improvements in Educational Records, of which the following is a specification.

My invention relates to phonographic records for the reproduction of musical compositions and the like and the object of my invention generally is a record having novel features of utility in the construction and arrangement thereof and particularly a record possessing unusual selling, using and educational values.

My novel record is preferably of the disc type and embodies a musical selection recorded thereon which may be readily reproducible on any of the standard reproducing machines of the art, and a visibly separated, but interrelated, record of spoken educational matter on the same disc with the musical selection, which may at the will and choice of the operator be reproduced. Such visibly separated and readily distinguishable and reproducible record consists of spoken words constituting educational and instructive matter, briefly and interestingly told and relating to the musical selection combined on the same record and may be incorporated on the same side of the disc with the main portion of a record or it may be incorporated on the back, if desired. If the spoken and musical records are incorporated on the same face, a visibly separated and spacing band must be provided between the musical record and the spoken educational matter relating thereto in order to enable the user to select at will and with the greatest facility the particular part of the record he desires to reproduce or the order in which the portions are to be reproduced. The educational portion of the record may consist of remarks teaching the character and merits of the music and special features relating thereto and/or certain facts concerning the writing of the song or selection and interesting facts, historical or otherwise, concerning the author of the selection and the reproducing artists.

Such a record has numerous advantages and features of utility. For example, each record is its own salesman rendering it unnecessary for the distributor to employ skilled and learned assistants to explain and demonstrate the same, and the auxiliary visibly separated spoken portion of the record, embodying a carefully prepared description prepared by a person, versed and learned in such matters, gives to the record qualities of accuracy and authority which appeal alike to the user and the seller. The ordinary salesman has not such knowledge or the ability to impart knowledge clearly. The obvious educational utility of my invention is the readily available and reproducible record imparting to anyone who is interested a knowledge and general understanding of the best there is along musical lines and thereby tending to spread and render more universal the knowledge and love of good music. My invention would be usually employed in connection with the standard high-class musical reproductions, and in addition to the historical outline and explanatory remarks there is given a reliable and correct vocal pronunciation of the names of the composition, the authors and the artists concerned. The user may readily select for himself either the record of the musical selection itself or the educational ancillary record as he so desires, rendering it unnecessary to reproduce both the musical record and the educational record unless he particularly desires such reproduction.

For a better understanding of my invention, reference may be had to the accompanying drawings wherein:

Fig. 1 is generally illustrative of a record embodying my invention; and

Figs. 2 and 3 is an illustration of another record embodying my invention in modified form.

Referring to the drawings wherein like numerals designate similar parts throughout and referring particularly to Fig. 1, I illustrate my invention as embodied in a record 10 of the disc type. This record 10 has embodied and incorporated thereon a reproducible musical selection 11. Such record may be reproduced on any of the standard machines on the market in the usual manner by placing the same thereon and causing the reproducing needle to traverse the spiral groove forming the record. The ancillary educational record is indicated at 12 and is incorporated on the outer part of the face of the disc, there being a visible separating space 13 disposed between the musical record portion 11 and the eductional one 12. This space separating and forming a dividing line between the two records should be wide enough to enable the user to readily distinguish between them with the eye and to position the reproducing needle at the beginning of either of the two portions of the records he may desire without confusion between the two. The two records are connected by a spiral groove which is disposed in the separating space 13 and whose ends form continuations of the sound grooves of records 11 and 12, so that the operator may, if desired, play the two records in succession without any interruption due to the necessity of positioning the needle by hand. The needle is automatically transferred from the ancillary record 12 to the musical selection 11. Ordinarily I would prefer that the groove 14 or the greater portion thereof be a plain non-sound record groove whereby a distinct pause occurs in the successive automatic reproduction.

The seller or demonstrator may be one who is quite uninformed regarding the subject matter of the selection but all he has to do in order to give the prospective buyer the complete information concerning the record is to reproduce the educational record, and then, if desired, the musical selection.

In the modification illustrated in Figs. 2 and 3 a record is illustrated having incorporated on one face thereof the main musical selection 15 while on the opposite face thereof is incorporated the vocal educational record 16. This modification has certain of the advantages above-mentioned in connection with Fig. 1.

I claim:

A talking machine record carrying on one surface a plurality of sound records each of which is a complete record in itself, the individual records being associated with portions of a spiral groove, the portions being radially displaced from each other and separated by an annular band of plane surface free of any sound record, the width of the band being sufficient to make it plainly visible, and a stylus guiding spiral groove to connect the adjacent individual records, the pitch of the guiding groove being greater than that of the record grooves.

In testimony whereof, I have signed my name to this specification.

MILTON E. THOMPSON.